Sept. 11, 1934.  E. E. LEE  1,973,318

AUTOMATIC STRIP PHOTOGRAPHIC CAMERA

Filed Feb. 8, 1932  4 Sheets-Sheet 1

Inventor
E. E. Lee
By Martin O. Smith
Attorney

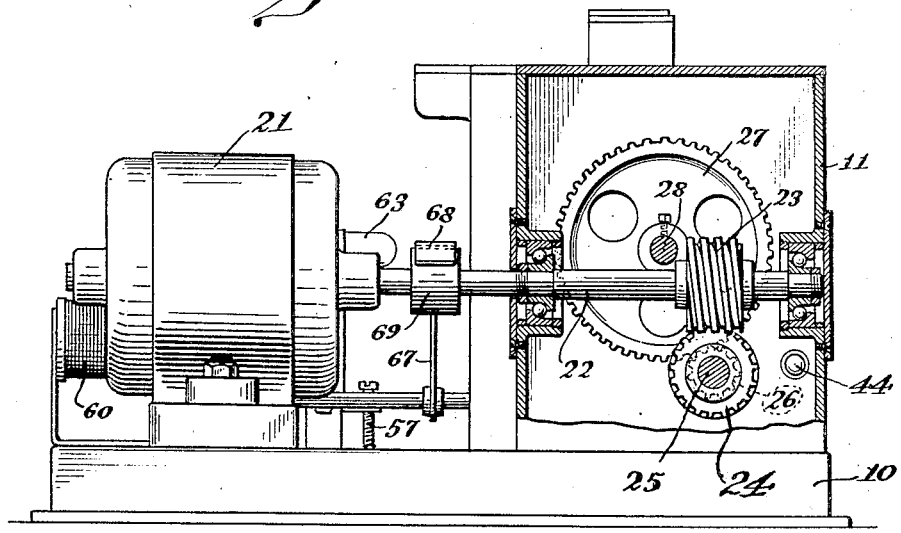
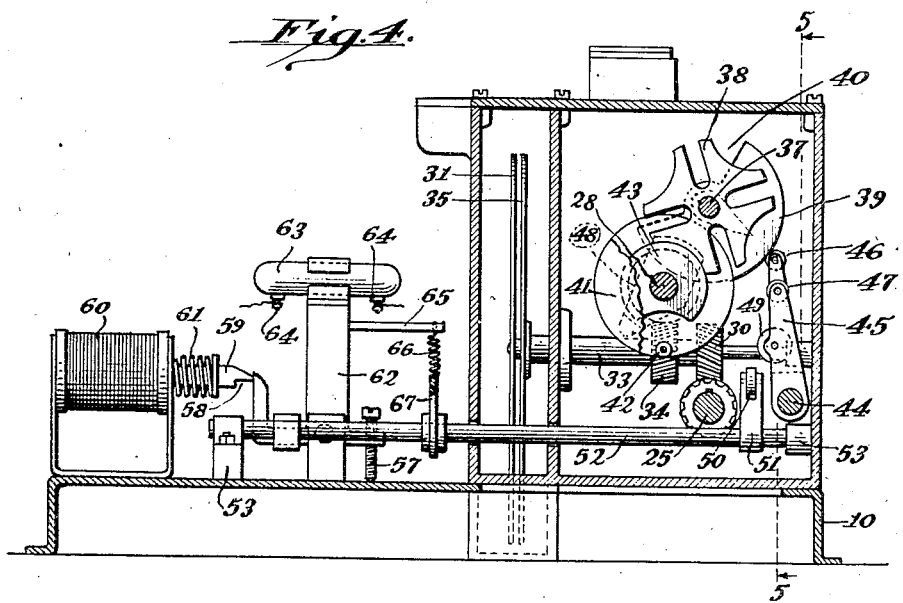

Sept. 11, 1934.  E. E. LEE  1,973,318
AUTOMATIC STRIP PHOTOGRAPHIC CAMERA
Filed Feb. 8, 1932   4 Sheets-Sheet 3
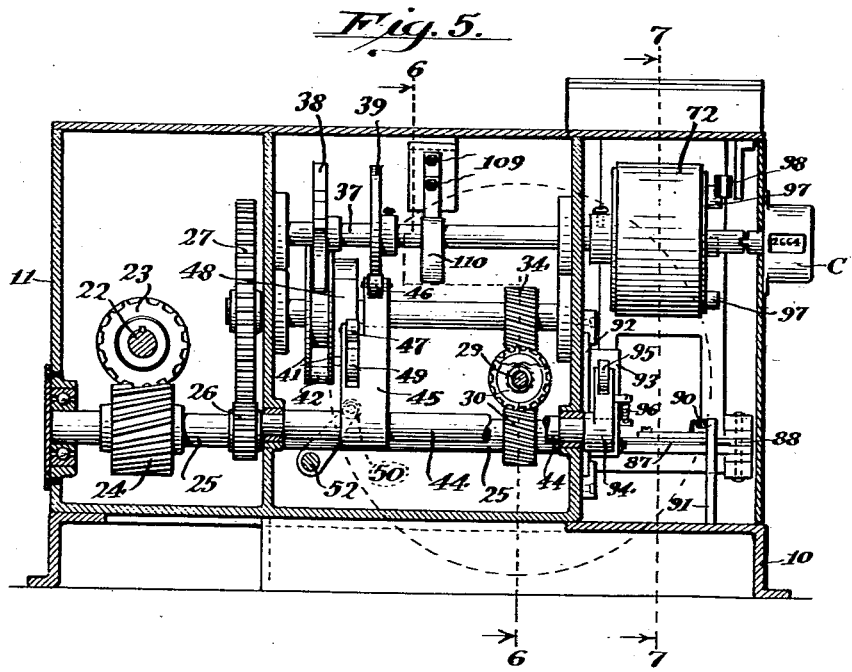
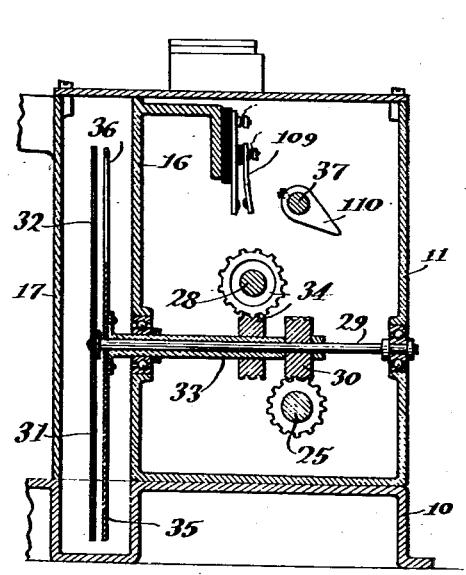 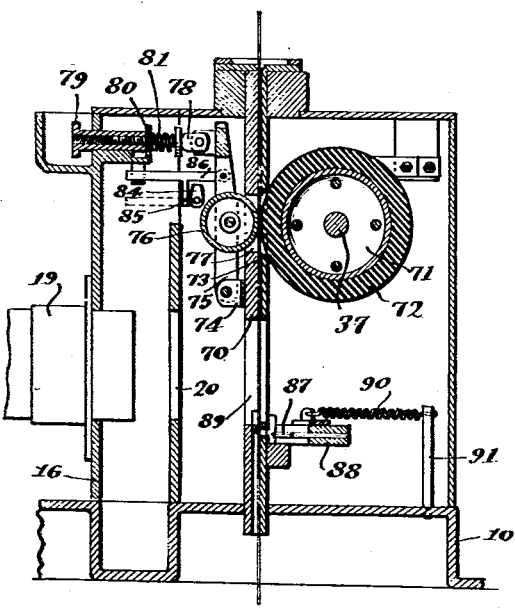

Sept. 11, 1934. E. E. LEE 1,973,318
AUTOMATIC STRIP PHOTOGRAPHIC CAMERA
Filed Feb. 8, 1932 4 Sheets-Sheet 4
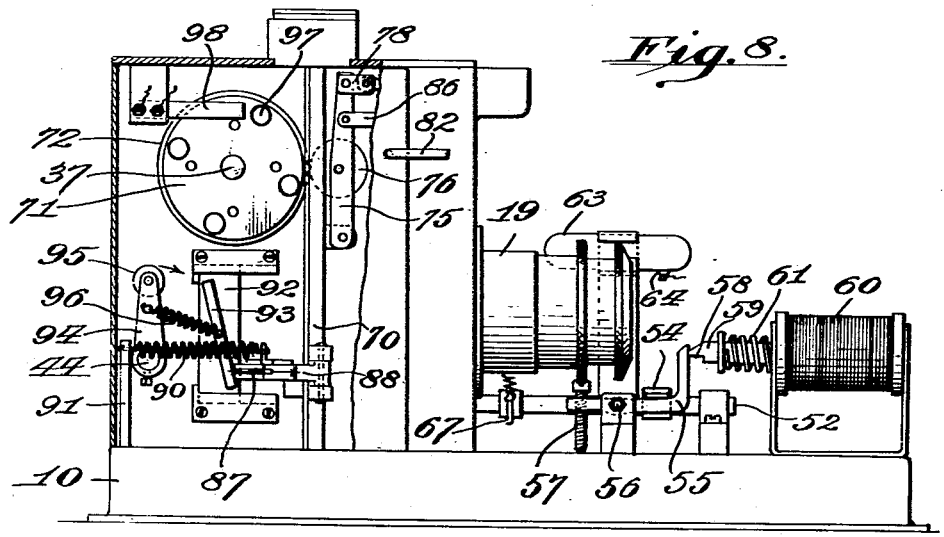
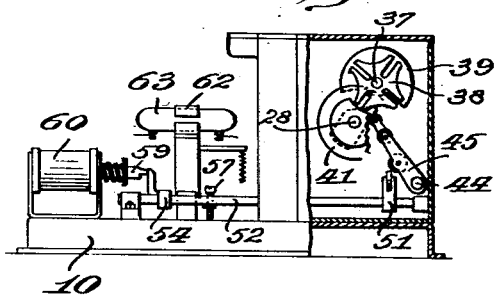
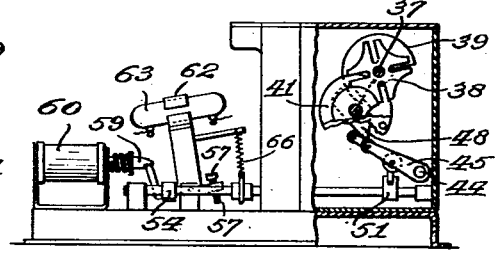
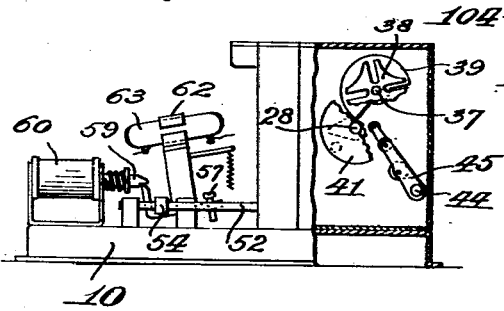
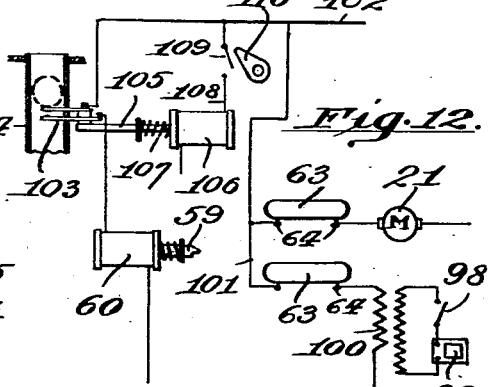

Patented Sept. 11, 1934

1,973,318

UNITED STATES PATENT OFFICE 1,973,318

AUTOMATIC STRIP PHOTOGRAPHIC CAMERA

Edward E. Lee, Los Angeles, Calif.

Application February 8, 1932, Serial No. 591,479

15 Claims. (Cl. 88—18.3)

My invention relates to photographic apparatus and more particularly to a camera for automatically making a series of exposures on a sensitized strip of paper, celluloid or the like and which is intermittently moved through the apparatus.

The principal objects of my invention are, to generally improve upon and simplify the construction of the existing forms of automatically operating strip photographic cameras, further, to provide a photographic camera of the character referred to wherein all of the principal operating parts, including the shutter and strip moving means are actuated by a small electric motor and further, to provide means whereby the strip of sensitized paper or other material is automatically cut from the web of paper that enters the machine after the series of exposures have been made upon the cut section of paper.

Further objects of my invention are, to provide a strip photographic camera wherein a short interval of time occurs between the exposures made upon the strip that passes through the machine, thus enabling the person whose picture is being taken to change pose, further, to provide an automatically operating audible signal for indicating the periods between the exposures made by the shutter of the camera and further, to provide simple and efficient means for controlling the rollers that move the sensitized strip through the machine so that the length of the "frames" or exposure areas on the strip may be adusted in length.

A further object of my invention is, to provide a strip photographic camera of the character referred to that may be conveniently employed in stores, waiting rooms, arcades and the like, for producing in comparatively short time, strips on which appear a plurality of photographs of the person that poses in front of the lens of the camera and the operation of which camera is controlled by the insertion of a coin in a slot or by the manipulation of a switch by an attendant.

With the foregoing and other objects in view, my invention consists in certain novel features of construction and arrangement of parts that will hereinafter be more fully described and claimed and illustrated in the accompanying drawings in which:

Fig. 3 is an elevational view partly in section, taken on the line 3—3 of Fig. 1.

Fig. 4 is a section taken approximately on the line 4—4 of Fig. 1, and showing the Geneva motion and the cams utilized in my improved camera.

Fig. 5 is a cross section taken on the line 5—5 of Fig. 4.

Fig. 6 is a vertical section taken on the line 6—6 of Fig. 5.

Fig. 7 is a vertical section taken on the line 7—7 of Fig. 5, and showing the strip feeding and cutting means.

Fig. 8 is an elevational view partly in section, looking in the direction indicated by the arrow 8 in Fig. 1.

Fig. 9 is an elevational view partly in section on a reduced scale, and showing the position of the parts during the movement of the strip into position for the last exposure.

Fig. 10 is a view similar to Fig. 9 and showing the position of the operating parts as they appear immediately after the strip has been cut and after the mercury switches have been tripped.

Fig. 11 is a view similar to Figs. 9 and 10, and showing the normal position of the parts of the camera before actuation thereof.

Fig. 12 is a diagrammatic view illustrating the electrical connections between the coin actuated switch, the mercury switches and the audible signal.

Figure 1:
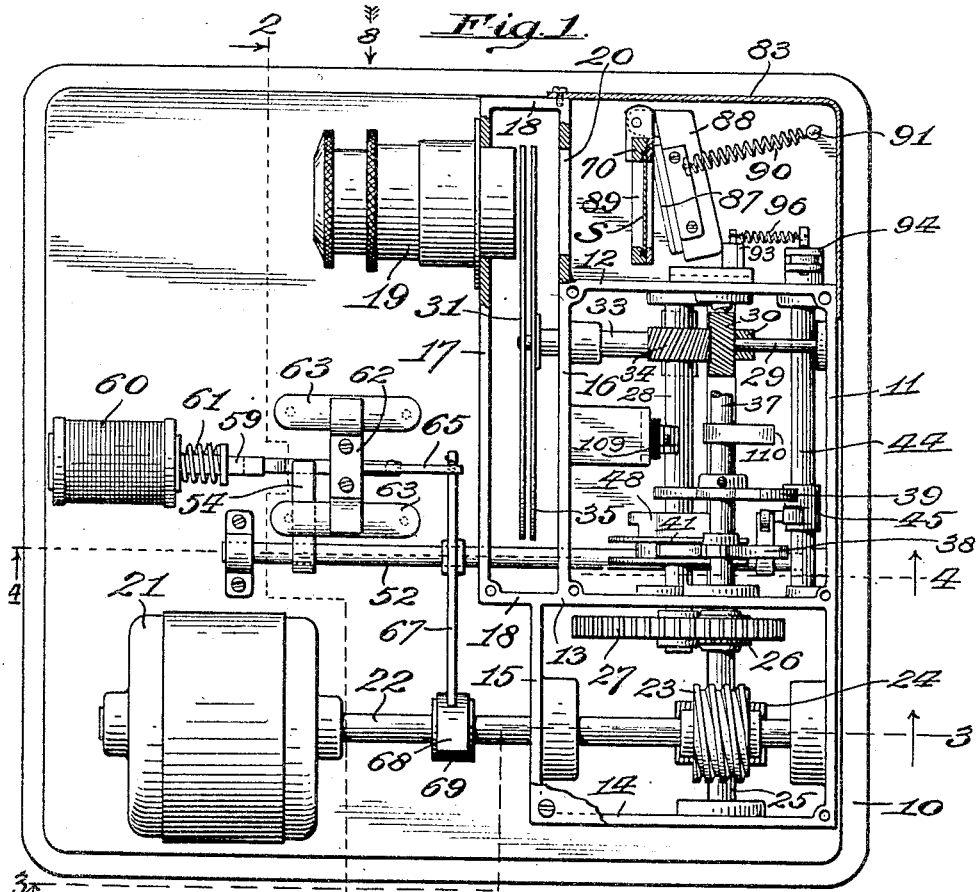
Fig. 1 is a top plan view of the camera, with parts thereof broken away and in section and with the cover plate of the housing removed in order to show the operating parts of the camera.
Figure 2:
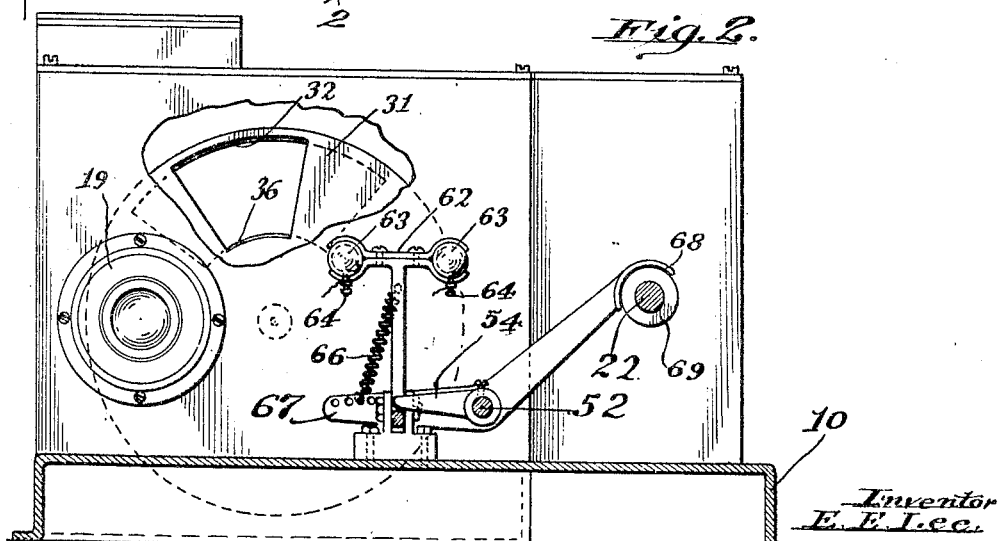
Fig. 2 is a vertical cross section taken on the line 2—2 of Fig. 1.

In the drawings, with the exception of Figures 9, 10 and 11, the various parts of the machine are shown in the postions they occupy during exposure of the third frame of a series of four exposures.

Referring by numerals to the accompanying drawings which illustrate a practical embodiment of my invention, 10 designates a base, preferably of cast metal and projecting upwardly therefrom, adjacent to the righthand edge, is a vertical wall 11 and projecting inwardly from said wall at right angles thereto, are walls 12, 13 and 14. Connecting the inner ends of the walls 13 and 14, is an inner end wall 15 and connecting the inner ends of walls 12 and 13 is a wall 16. A wall 17 is arranged parallel with wall 16 and the ends of these walls 16 and 17 are and are connected by short end walls 18.

A lens carrying barrel 19 is located in the righthand portion of wall 17 and formed in wall 16 immediately to the rear of this barrel is an exposure opening 20.

Mounted on base 10, in front of wall 15, is a small electric motor 21, having an extended shaft 22, that is journaled in suitable bearings on walls 11 and 15.

Fixed on shaft 22 between walls 11 and 15, is a worm 23, that engages a worm wheel 24, the latter being fixed on a shaft 25 that is journaled in suitable bearings on walls 12, 13 and 14.

Secured on shaft 25, between walls 13 and 14, is a pinion 26, that meshes with a gear wheel 27 and the latter is secured on a shaft 28 that is journaled in suitable bearings on walls 12 and 13.

Journaled in bearings on front wall 11 and wall 16, adjacent to and parallel with partition 12, is a shaft 29 that is driven from shaft 25 by spiral gearing 30 and the forward end of this shaft 29 terminates in the chamber between walls 16 and 17 and carries a disc 31, in which is formed an arcuate opening 32, that is adapted to register with the opening through the lens barrel 19 and with exposure opening 20, as said disc is rotated.

Journaled for rotation on shaft 29, is a sleeve 33, that is driven from shaft 28, by means of spiral gear 34, and carried by the end of this sleeve 33, within the space between partitions 16 and 17, is a disc 35 that occupies a position immediately adjacent to disc 31 and said disc 35 being provided with an opening 36 that is adapted to register with opening 32.

Opening 36 in disc 35, is considerably shorter than the opening 32 in disc 31, and the two discs with their openings, constitute a shutter for the camera.

Journaled in suitable bearings on walls 12 and 13, above and parallel with shafts 25 and 28, is a shaft 37, and secured thereto, adjacent to wall 13, is the radially slotted disc 38 of a Geneva movement.

Secured to shaft 37, adjacent to disc 38, is a cam disc 39, having a portion slightly greater than one-quarter of its circumference cut away, as designated by 40.

Secured on shaft 28 and cooperating with disc 38, is a pair of discs 41, between which is arranged a pin or roller 42, that is adapted to successively enter the radial slots in the disc 38 and partially rotate the same and arranged between said discs 41, is a smaller disc 43 that bears on the depressions in disc 38, between the slots therein and thus said discs 41 and 43 combine with disc 38 in producing the Geneva movement necessary to impart intermittent rotary motion to shaft 37.

Journaled in bearings on the front portion of walls 12 and 13, directly in front of shaft 25 and parallel therewith, is a shaft 44, to which is secured an arm 45 and journaled on the free end of said arm is a roller 46 that bears on the periphery of cam 39.

Journaled on arm 45 a short distance inwardly from the roller 46 and offset therefrom, is a roller 47 which, when arm 45 swings inwardly, is adapted to be engaged by a finger 48 that is secured on shaft 28 adjacent to the discs 41.

Journaled on arm 45, between shaft 44 and roller 47, is a roller 49 which, as arm 45 swings inwardly and downwardly, engages on top of a roller 50 that is journaled on the upper end of an arm 51 and the latter being secured to a shaft 52.

This shaft 52 is journaled in suitable bearings 53 and it is disposed directly below the Geneva motion and at right angles to shafts 25, 44 and 28.

Secured to the rear portion of shaft 52, is a laterally projecting finger 54 that bears on top of an L-shaped lever 55, fulcrumed at 56 and the end of the horizontal arm of this lever carrying an adjusting screw 57, the lower end of which is adapted to rest on top of base 10 and thereby limit the swinging movement of the lever in one direction.

The upper end of the vertical arm of lever 55 is adapted to engage in a notch 58 that is formed in the underside of the forward end of the core or armature 59 of a solenoid coil 60.

Associated with core 59, is a light spring 61, which yieldingly resists inward movement of said core.

Secured to and projecting upwardly from the intermediate portion of lever 55, is a bracket 62 carrying at its upper end a pair of horizontally disposed closed tubes 63, preferably of glass and provided at their ends with contacts 64 and each tube containing a sufficient amount of mercury to engage said contacts when the tubes are in horizontal positions.

Projecting from the upper portion of bracket 62, toward wall 17, is a pin 65 and connected to said pin is the upper end of a retractile spring 66, the lower end thereof being adjustably connected to one end of a bell-crank 67 and the latter being secured on shaft 52.

The opposite end of bell-crank 67 carries a shoe 68, that is adapted to engage a small brake drum 69 that is carried by motor shaft 22.

Arranged vertically a short distance to the rear of exposure opening 20 in wall 16, is a vertically disposed chute or guide-way 70, for the sensitized strip S, upon which the exposures are made and which strip feeds downwardly through the chute from a light-proof drum or housing (not shown) and which latter is mounted on top of said chute or guide-way.

Mounted on shaft 37, directly in front of the chute or guide-way 70, is a strip feeding roller 71, the peripheral portion 72 of which comprises a thick layer of relatively soft highly elastic rubber and formed in the adjacent wall of chute 70, is an opening 73 for the accommodation of the periphery of this said roller.

Pivoted to a bracket 74, on the rear side of chute 70, is the lower end of a vertically disposed frame 75 and journaled therein, is a strip feeding roller 76 that is formed of metal, hard rubber or the like and the diameter of which is considerably less than the diameter of feed roller 71 and its elastic covering.

An opening 77 is formed in the rear wall of the chute 70, directly opposite the opening 73 and this opening 77 permits the roller 76 to bear against the sensitized strip that is fed downwardly through the chute between two rollers.

The upper end of frame 75 is pivotally connected to the inner end of a stem 78, the outer portion of which is threaded for the reception of a tubular adjusting nut 79 and the inner end of the latter bears against a bracket 80, on the adjacent wall 16.

Arranged on stem 78, in front of the bracket 80, is an expansive spring 81 that normally exerts pressure against the upper end of frame 75 and consequently causes roller 76 to press against the sensitized strip that passes downwardly through the chute.

The rotation of tubular nut 79 moves stem 78 inwardly or outwardly, thereby varying the tension of spring 81.

In order to swing frame 75 carrying roller 76, away from the chute to permit the sensitized strip to be started downwardly through said chute, an arm 82 is journaled in one of the walls of a housing 83 that encloses the strip feeding means and the inner end of said arm carries a finger 84 that is adapted to engage the depending finger 85 of an arm 86 that is pivoted to the upper portion of frame 75.

The free end of arm 86 is suspended from the underside of bracket 80.

After a predetermined number of exposures have been made on the sensitized strip, the exposed portion of said strip is severed by means of a blade 87 that is carried by a horizontally disposed swinging frame 88. This blade carrying frame is pivotally connected at one end to the side of chute 70 just below the exposure opening 89 therein and which opening is in horizontal alignment with the opening 20 and the lens barrel 19.

Connected to the intermediate portion of the frame 88, is one end of a retractile spring 90, the opposite end of which is connected to a pin 91 that projects upwardly from base 10. This spring normally holds the frame and blade away from the chute.

Arranged for horizontal sliding movement upon the outer face of wall 12, is a plate 92, and projecting from the face thereof, is an inclined rib 93, the lower portion of which bears against the rear side of frame 88, adjacent to the free end thereof.

Secured to the adjacent end of shaft 44, is an arm 94, the free end of which carries a roller 95 that is adapted to engage inclined rib 93 as said arm is swung inwardly and connecting the intermediate portion of ring 93 and arm 94 is a retractile coil spring 96.

The construction just described provides means for actuating the strip blade that is carried by pivoted frame 88.

Projecting from the side face of strip feeding roller 71, is a plurality of pins 97, spaced at equal distances apart and which, as the roller makes a complete revolution, are adapted to engage and close a normally open spring switch 98. This switch is electrically connected to an audible signal 99, either a bell or buzzer and to one of the coils of a transformer 100. The other coil of this transformer is electrically connected to one of the contacts 64 of one of the mercury switches 63.

The other one of the contacts of this particular switch is electrically connected by a conductor 101 to an electric current supply line 102.

The contacts of the other one of the mercury switches 63 are connected respectively to conductor 101 and to motor 21.

Where my improved camera is operated as a result of a coin dropped in a slot or chute, a normally open spring switch 103 is arranged to slide into and out of a suitably located coin chute 104 and one of the contacts of this switch is electrically connected to solenoid coil 60 and the other contact of said switch is electrically connected to supply line 102.

Switch 103 is carried by an arm 105 that projects from the armature or core of a solenoid coil 106, said armature or core having associated therewith a spring 107 that yieldingly resists its inward movement. Coil 106 is electrically connected to supply line 102 by a conductor 108 and located therein is a normally open spring switch 109 and the latter being mounted on a bracket that projects inwardly from wall 16.

Carried by shaft 37, is a finger 110 which as said shaft rotates engages switch 109 so as to complete the circuit from supply line 102 to solenoid 106.

In order to record the number of exposures made by the machine, a standard form of conventional counter may be suitably located on the side of housing 83 and the main driving shaft of said counter connected to the end of shaft 37 that carries the strip feeding roller 71.

The operation of my improved camera is as follows:

With the machine in normal position ready for use, the parts of said machine occupy the positions illustrated in Figs. 11 and 12 with the mercury switches tilted so that the pairs of contacts 64 are not connected.

Where the machine is arranged to be started and operated by the insertion of a coin in a slot or chute, switch 103 projects into chute 104 and the insertion of a coin in said chute closes switch 103 so that electric current from line 102 passes through and energizes coil 60, thereby drawing armature 59 into said coil and releasing lever 55 and permitting the same to swing or tilt upon its axis 56 under the influence of retractile spring 66 and when said lever reaches an approximate horizontal position it will be stopped by screw 57 engaging the top of base 10. As this section takes place bracket 62 will swing into a substantially vertical position so that tubes 66 are in a horizontal position, with the result that the mercury within said tubes makes contact with the respective pairs of contacts 64.

Electric current from line 102 passes through conductor 101, thence through one of the mercury switches to the motor 21 so as to start and operate same and as a result continuous rotary motion is imparted from said shaft 22 through worm 23 and worm wheel 24 to shaft 25.

Pinion 26 on shaft 25 meets this continuous rotary motion of the shaft 28 through gear wheel 27 and through spiral gearing 34 motion is transmitted to sleeve 33 that carries disc 35 and simultaneously rotary motion from shaft 25 is transmitted through gearing 30 to shaft 29 that carries disc 31.

As a result of the operation of the Geneva movement comprising the discs 38, 41 and pin or roller 42, a continuous rotary motion of shaft 28 is converted into intermittent rotary motion and transmitted to shaft 37.

In the form of Geneva movement illustrated, disc 38 is provided with four radial slots and thus shaft 37 will be intermittently rotated a quarter turn and the machine will make four exposures on the sensitized strip that is intermittently fed downwardly through chute 70.

Due to the relative sizes of pinion 26 and gear 27, shaft 28 is driven at one-quarter the speed of shaft 25 and as a result, sleeve 33 carrying disc 35 having the relatively short opening 36, will travel at one-quarter the speed of disc 31 having the longer opening.

The person that is being photographed occupies a position in front of the lens barrel 19 and when the openings 32 and 36 in discs 31 and 35 coincide with each other and with the axis of the lens barrel and the opening 20, an exposure will be made upon that portion of the sensitized sheet that is exposed through opening 89.

The length of the longer opening 32 in disc 31, which moves at four times the speed of disc 35, determines the length of time of the exposure made on the sensitized sheet.

Immediately after the openings 32 and 33 have moved out of registration with each other and out of alignment with the lens barrel and openings 20 and 89, the Geneva motion will cause shaft 37 to be rotated one-quarter turn and the pressure and resilient surface of said roller against the sensitized strip and which latter bears against roller 76 will move said strip downwardly through the chute 70 the distance of one frame or picture so as to present an unexposed surface in the exposure opening 89.

As roller 71 starts to move a quarter turn as just described, one of the pins or lugs 97 passes and momentarily closes switch 98 so that current from conductor 101 may flow through the mercury switch 63 to which said conductor is connected, thence through transformer 100, so as to cause bell or buzzer 99 to momentarily operate, thereby producing an audible signal to notify the person in front of the lens barrel to change pose.

Immediately after the downwardly feeding movement of the sensitized strip ceases, the exposure openings 32 and 36 in the discs 31 and 35, will register with each other and with the lens barrel and exposure openings 20 and 89, thereby making the second exposure on the strip and the operations just described are repeated until four exposures have been made on the strip.

At the termination of the third exposure, roller 46 on the end of arm 45 rolls from the periphery of cam 39 into the notch or cut away portion 40 and consequently said arm swings inwardly and downwardly so as to position roller 47 in the path of travel of the end of finger 48 (see Fig. 9) and immediately following the fourth exposure, said finger 48 will engage roller 47 and move the same together with arm 45 downwardly into the position as illustrated in Fig. 10.

This swinging movement of arm 45 imparts partial rotary movement to shaft 44 and following such movement, arm 94 will swing inwardly and downwardly and roller 95 carried by said arm will engage against inclined rib 93 and move plate 92 inwardly. The engagement of this plate on its inward movement with the free end of frame 88, swings said frame upon its axis and the blade 87 carried by said frame will sever the sensitized strip at a point just below the exposure opening 89 and that portion of the strip that is thus severed and which contains the four exposures is withdrawn from the machine by an attendant and placed in a developing bath.

As arm 45 is moved inward and downward to its limit of movement, roller 49, carried by said arm, will engage roller 50 on arm 51, thereby imparting partial rotary motion to shaft 52 and finger 54, carried by said shaft, will bear downward on top of lever 55 to restore the same to its normal position, whereupon the upper end of the vertical leg of bell-crank 55 will reengage in notch 58 of armature 59 and bracket 62 will swing back to its normal position so as to open the mercury switches carried by the upper end of said bracket and consequently cutting off the current to motor 21 and audible signal 99.

As bracket 62 returns to its normal position, the movement of arm 65 will expel retractile spring 66 slightly, thereby swinging lever 67 on its fulcrum, the shaft 52, and shoe 68 will engage drum 69, thereby functioning as a brake to stop the rotation of motor shaft 22.

Just before the shaft 37 completes the revolution, finger 110 momentarily closes switch 109, thereby permitting coil 106 to receive current from line 102, thus energizing said coil and drawing armature 105 thereinto so as to withdraw switch 103 from the coin chute 104 and permit coin to drop through said chute into a suitable receptacle.

As finger 110 moves past switch 109, the same opens and spring 107 will act to move armature 105 outwardly and thereby reposition switch 103 in the coin chute.

Springs 90 and 96 restore the blade carrying frame 88 and sliding plate 92 to their normal positions and as the roller 46 rides out of notch 40 in cam 39, arm 45 is restored to its normal position and shaft 44 is correspondingly rotated.

The length of the frames or exposures made on the sensitized strip may be shortened by manipulating nut 79 so as to swing the upper portion of frame 75 inwardly toward roller 71 and as a result of this action roller 76 will be pressed against the resilient surface of roller 71 so as to indent the same and thus the distance between the axis of roller 71 and the point of contact of roller 76 and the interposed strip with the indented surface of roller 71 will be materially shortened and consequently shorten the longitudinal feeding movement imparted to said strip obviously by proper adjustment of the frame 75 carrying pressure roller 76, the length of the frames or exposures made on the sensitized strip may be very accurately regulated.

When it is desired to feed the end of a roll of sensitized paper into the chute 70, roller 76 may be caused to move away from roller 71 by actuation of arm 82, which carries finger 84 and the latter engages finger 85 on arm 86.

Thus it will be seen that I have provided a strip photographic camera that is relatively simple in construction, entirely automatic in operation and which is very effective in performing the functions for which it is intended.

It will be understood that minor changes in the size, form and construction of the various parts of my improved automatic strip photographic camera may be made and substituted for those herein shown and described without departing from the spirit of my invention, the scope of which is set forth in the appended claims.

I claim as my invention:

1. In a strip photographic camera, the combination with a wall provided with an exposure opening, of a lens arranged in front of said opening, a sensitized strip guide positioned to the rear of said opening the walls of said strip guide being provided with registering openings, a pair of discs arranged for operation between said lens and said exposure opening, said discs having openings of different lengths, means for operating said discs at different speeds, a pair of sensitized strip feeding rollers of different diameters arranged on opposite sides of said strip guide and projecting respectively through the openings therein, a thick layer of soft highly elastic rubber on the surface of the larger roller, the small roller having a hard surface, means for adjusting the small roller toward the large roller so that the interposed sensitized strip may be pressed a substantial distance below the normal surface of the large roller and motor driven means including a Geneva movement for intermittently imparting rotary motion to the larger one of said rollers.

2. In a strip photographic camera, the combination with a wall provided with an exposure opening, of a lens arranged in front of said opening, a sensitized strip guide positioned to the rear of said opening the walls of said strip guide being provided with registering openings, a pair of discs arranged for operation between said lens and said exposure opening, said discs having openings of different lengths, means for operating said discs at different speeds, a pair of sensitized strip feeding rollers of different diameters arranged on opposite sides of said strip guide and projecting respectively through the openings therein, a thick layer of soft highly elastic rubber on the surface of the larger roller, the small roller having a hard surface, means for adjusting the small roller toward the large roller so that the interposed sensitized strip may be pressed a substantial distance below the normal surface of the large roller, motor driven means including a Geneva movement for intermittently imparting rotary motion to the larger one of said rollers and means for severing said sensitized strip at the termination of a predetermined number of exposures thereupon.

3. In a strip photographic camera, the combination with a wall provided with an exposure opening, of a lens in front of said opening, a shutter arranged for operation between said lens and opening, said shutter comprising a pair of discs provided with openings of different lengths, means for rotating said discs at different speeds, a sensitized strip guide arranged to the rear of said exposure opening the walls of which strip guide are provided with registering openings, a pair of sensitized strip feeding rollers of different diameters arranged on opposite sides of said strip guide and projecting respectively through the openings therein, a thick layer of soft highly elastic rubber on the surface of the larger roller, the small roller having a hard surface, means for adjusting the small roller toward the large roller so that the interposed sensitized strip may be pressed a substantial distance below the normal surface of the large roller.

4. In a strip photographic camera, the combination with a wall provided with an exposure opening, of a lens in front of said opening, a shutter arranged for operation between said lens and opening, said shutter comprising a pair of discs provided with openings of different lengths, means for rotating said discs at different speeds, a sensitized strip guide arranged to the rear of said exposure opening the walls of which strip guide are provided with registering openings, a pair of sensitized strip feeding rollers of different diameters arranged on opposite sides of said strip guide and projecting respectively through the openings therein, a thick layer of soft highly elastic rubber on the surface of the larger roller, the small roller having a hard surface, means for adjusting the small roller toward the large roller so that the interposed sensitized strip may be pressed a substantial distance below the normal surface of the large roller means including a Geneva movement for imparting intermittent motion to the larger one of said rollers and an electric motor for operating said roller driving means.

5. In a strip photographic camera, the combination with a wall provided with an exposure opening, of a lens in front of said opening, a shutter arranged for operation between said lens and opening, said shutter comprising a pair of discs provided with openings of different lengths, means for rotating said discs at different speeds, a sensitized strip guide arranged to the rear of said exposure opening the walls of which strip guide are provided with registering openings, a pair of sensitized strip feeding rollers of different diameters arranged on opposite sides of said strip guide and projecting respectively through the openings therein, a thick layer of soft highly elastic rubber on the surface of the larger roller, the small roller having a hard surface, means for adjusting the small roller toward the large roller so that the interposed sensitized strip may be pressed a substantial distance below the normal surface of the large roller means including a Geneva movement for imparting intermittent motion to the larger one of said rollers, an electric motor for operating said roller driving means and a coin actuated mercury switch for controlling the delivery of electric current to said motor.

6. In a strip photographic camera, the combination with a lens, of a sensitized paper guide arranged to the rear of said lens and provided with an exposure opening in alignment with said lens the walls of said guide being provided with a pair of registering openings, a pair of cooperating feed rollers arranged to move the sensitized strip through said guide, the peripheral portions of which feed rollers project into the registering openings in said guide, a thick layer of elastic material on the periphery of the larger one of said rollers, the other roller being mounted for adjustment toward and away from the roller having the elastic periphery and having a hard surface whereby the interposed sensitized strip may be pressed a substantial distance below the normal periphery of the roller having the elastic surface, means for imparting intermittent movement to the roller having the elastic periphery, means for automatically severing the sensitized strip at a point below the exposure opening in said guide after a predetermined number of exposures have been made on said strip and electrically operated means actuated by the intermittently moving feed roller for producing an audible signal at the termination of its intermittent movements.

7. In a strip photographic camera, a sensitized strip guide the walls of which strip guide are provided with registering openings, a feed roller mounted for operation and adapted to engage a strip of paper passing through said guide, a thick layer of elastic material on the surface of said feed roller, an adjustable frame mounted on said guide, a hard surfaced roller carried by said frame for engaging the sensitized strip passing through said guide and pressing the same a substantial distance below the normal surface of the layer of elastic material on said feed roller the peripheral portions of the two rollers projecting respectively through the registering openings in the walls of the strip guide and means for adjusting the position of said frame.

8. In a strip photographic camera, a sensitized strip guide the walls of which guide are provided with registering openings, a feed roller mounted for operation and adapted to engage a strip of paper passing through said guide, a thick layer of elastic material on the surface of said feed roller, an adjustable frame mounted on said guide, a hard surfaced roller carried by said frame for engaging the sensitized strip passing through said guide and pressing the same a substantial distance below the normal surface of the layer of elastic material on said feed roller the peripheral portions of which rollers extend respectively through the registering openings in the walls of the strip guide, means for adjusting the position of said frame and means for imparting intermittent rotary motion to said feed roller.

9. In a strip photographic camera, a sensitized strip guide the walls of which guide are provided with registering openings, a feed roller mounted for operation and adapted to engage a strip of paper passing through said guide, a thick layer of elastic material on the surface of said feed roller, an adjustable frame mounted on said guide, a hard surfaced roller carried by said frame for engaging the sensitized strip passing through said guide and pressing the same a substantial distance below the normal surface of the layer of elastic material on said feed roller the peripheral portions of which rollers extend respectively through the registering openings in the walls of the strip guide, means for adjusting the position of said frame and means for severing the strip that passes through said guide subsequent to the passage of a predetermined portion of said strip through said guide.

10. In a strip photographic camera, a lens, a sensitized strip guide arranged to the rear of said lens and having an exposure opening in alignment with said lens, a shutter comprising a pair of discs mounted for rotation between the shutter and the strip guide, said discs having exposure openings the length of the opening in one disc being substantially twice the length of the opening in the other disc, means for simultaneously driving said discs at different speeds, the speed of the disc having the longer opening being substantially four times the speed of the disc having the shorter opening, means for intermittently feeding a sensitized strip through said strip guide said feeding means comprising a pair of cooperating rollers of different sizes, the small roller having a hard surface, a thick layer of rubber on the larger roller, a Geneva motion for imparting intermittent movement to the larger roller and an electric motor for driving said shutter discs and said intermittently operating sensitized strip feeding means.

11. A strip photographic camera as set forth in claim 10, and with means for automatically severing the sensitized strip after a predetermined number of exposures have been made thereon through said lens.

12. A strip photographic camera as set forth in claim 10, with electric connections from a source of current supply to said electric motor and a coin actuated mercury switch in said electric connections.

13. A strip photographic camera as set forth in claim 10, with electrically operated means including a switch that is closed by the strip feeding means for sounding an audible signal at the termination of each intermittent movement imparted to said strip.

14. In a strip photographic camera, the combination with a straight sensitized strip guide provided with an opening that intersects the strip passageway in said guide of strip feeding rollers arranged on opposite sides of said guide with their peripheries projecting into said openings, said feeding rollers being of different diameters, a thick layer of elastic material on the peripheral surface of the larger roller, the smaller roller having a hard surface said straight strip guide being disposed tangent to the peripheral surface of the two rollers and projecting above and below the axes thereof and means for adjusting the small roller toward the larger roller so as to press the interposed sensitized strip below the normal surface of the layer of elastic material on the larger roller.

15. A strip photographic camera as set forth in claim 14 and with means for imparting intermittent rotary motion to the larger one of said feed rollers.

EDWARD E. LEE.